United States Patent [19]

Chandrupatla

[11] Patent Number: 4,854,925

[45] Date of Patent: Aug. 8, 1989

[54] MULTI-RATIO DRIVE SYSTEM FOR SPROCKETS HAVING TRANSLATING PINS

[75] Inventor: Tirupathi R. Chandrupatla, Flint, Mich.

[73] Assignee: GMI Engrg., & Mgmt., Institute, Flint, Mich.

[21] Appl. No.: 118,236

[22] Filed: Nov. 6, 1987

[51] Int. Cl.[4] .......................................... F16G 13/04
[52] U.S. Cl. .................................... 474/212; 474/214
[58] Field of Search ........ 474/202, 205, 206, 212–218, 474/155–157

[56] References Cited

U.S. PATENT DOCUMENTS

| | | | |
|---|---|---|---|
| 652,092 | 6/1900 | Desprez | 474/56 |
| 663,928 | 12/1900 | Pratt | 474/57 |
| 679,076 | 7/1901 | Johnston | 474/53 |
| 1,428,999 | 9/1922 | Tygard | 474/47 |
| 1,560,647 | 11/1925 | Belcher | 474/214 X |
| 1,598,906 | 9/1926 | Dull | 474/214 |
| 1,663,414 | 3/1928 | Mize | 474/52 |
| 2,049,065 | 7/1936 | Kahn | 474/53 |
| 2,211,548 | 8/1940 | Schwinn | 192/64 |
| 2,394,112 | 2/1946 | Schwinn | 192/64 |
| 2,584,447 | 2/1952 | Hayot | 474/50 |
| 2,827,795 | 3/1958 | Caballeros | 474/69 X |
| 3,269,212 | 8/1966 | Voland | 74/504 |
| 3,756,091 | 9/1973 | Miller | 474/153 |
| 3,782,210 | 1/1974 | Holleman | 474/72 X |
| 3,873,125 | 3/1975 | Bendles et al. | 280/731 |
| 3,913,410 | 10/1975 | Ackman | 474/56 |
| 3,929,025 | 12/1975 | Perry | 474/70 |
| 3,935,751 | 2/1976 | Lee | 474/50 |
| 4,056,013 | 1/1977 | Snyder | 474/72 |
| 4,119,326 | 10/1978 | Porter | 474/29 X |
| 4,164,153 | 8/1979 | Moritsch et al. | 474/70 |
| 4,167,124 | 9/1979 | Zvetkov et al. | 474/53 |
| 4,342,559 | 8/1982 | Williams | 474/50 |
| 4,457,739 | 7/1984 | Iseman | 474/49 |
| 4,632,665 | 12/1986 | Skura | 474/205 |

FOREIGN PATENT DOCUMENTS

| | | |
|---|---|---|
| 960014 | 4/1950 | France . |
| 1027817 | 5/1953 | France . |

OTHER PUBLICATIONS

Chains for Power Transmission and Material Handling, 47–77, 95–117, Marcel Dekker, Inc. ©1982.
Historical Development of the Kumm Flat Belt CVT, Kumm Industries, Inc. Brochure.

*Primary Examiner*—Thuy M. Bui
*Attorney, Agent, or Firm*—Brooks & Kushman

[57] ABSTRACT

A multi-ratio drive utilizing a chain link or a belt segment specifically designed to engage a sprocket having a plurality of cylindrical pins radially spaced from one another in a circular array. The chain links or belt segments are connected to one another to form a flexible tensile member. The chain embodiment is formed of a plurality of link plates each having a first and second end pivotably attached to one another and extending along a chain axis. Each link is provided with two teeth projecting transversally from the chain axis and each having a concave drive face having a radii substantially equal to that of the sprocket pins to be engaged thereby.

30 Claims, 5 Drawing Sheets

FIG. 18

MULTI-RATIO DRIVE SYSTEM FOR SPROCKETS HAVING TRANSLATING PINS

FIELD OF INVENTION

The present invention relates to the field of chain or belt drive systems, or more particularly, multi-ratio drives using a sprocket having a plurality of parallel translating pins equally spaced radially from one another in two or more concentric rows.

BACKGROUND OF INVENTION

Since the early 1900's there have been numerous attempts to develop a practical multi-ratio drive system to mechanically transmit power between two rotating shafts where the drive ratio can be varied under a load. A simple multi-ratio drive has numerous applications in both the motor vehicle and the bicycle industries. Much attention has been focused upon variable diameter pulleys which engage conventional V-belts, as shown in U.S. Pat. No. 4,342,559 — Williams. Some work has also been done in the chain area using variable diameter sprockets. An early example of a variable diameter sprocket mechanism is shown in U.S. Pat. No. 1,428,999 — Tygard. The Tygard patent employs a sprocket having a plurality of concentric rows of cylindrical pins which translate axially between an operative and inoperative position to vary the effective sprocket diameter. The pins which are mechanically shifted fore and aft directly engage a chain which has been adapted to fit the pins. A more recent version of the Tygard mechanism is shown in U.S. Pat. No. 4,457,739 — Iseman, which is incorporated by reference herein. Since the Iseman transmission is adapted to be used in a bicycle, the sprocket assembly is much thinner, there are more ratios, and the reverse gear of Tygard is eliminated.

There are a number of mechanical problems associated with variable ratio sprockets and chains of the type shown in Tygard and Iseman which have hindered commercialization of these mechanisms. The principal problems are related to: pin shifting, chain-pin interference, chain ratcheting and the chain tensioning mechanism. During each revolution of the sprocket, a chain link must engage and disengage a pin. The link must be designed so that interference is kept to a minimal level at all sprocket diameters and chain loads. The Tygard patent discloses a generally C-shaped link with a large amount of link chain interference which will increase with the load as the link deforms. The Iseman chain is designed to operate over a wide range of sprocket diameters, resulting in moderate interference and a tendency to ratchet, i.e., chain slippage, across the pins, at large sprocket diameters. In order to avoid ratcheting, it is necessary to maintain high chain slack side tension.

OBJECTS, FEATURES AND ADVANTAGES OF INVENTION

It is an object of this invention to provide a flexible endless member, such as a chain or belt, to be used in conjunction with a variable diameter sprocket to minimize interference and ratcheting.

It is a further object of this invention to develop a chain or a belt which will have a geometry which will not substantially change as a result of tensile loading.

A feature of the invention is that the geometry of the chain link or belt segments is optimized to achieve minimal ratcheting at large sprocket diameters and no interference even at the smallest sprocket diameter.

An advantage of the present invention is that the ratcheting tendency is dramatically reduced, enabling the slack side tension to be lowered and the tensioning mechanism simplified.

Another advantage of the present invention is that interference has been substantially reduced, eliminating noise and wear associated therewith.

These and other objects, features and advantages of the present invention are apparent upon the review of the preferred embodiment disclosed.

SUMMARY OF INVENTION

The present invention is directed to a chain link or belt segment which is specifically designed to engage a sprocket having a plurality of cylindrical pins spaced radially from one another in a circular array. The chain link is formed of a plate having a first and second end. A first and second pivot are formed in the plate at each end defining a first and second pivot axis perpendicular to the plate. A link centerline extends between the pivot and a first and second tooth project transversally therefrom, adjacent each pivot. Each tooth is provided with a drive face. The first drive face is formed on the first tooth and oriented toward the first link end, and the second drive face is formed on the second tooth and oriented towards the link's second end. The drive faces are concave and have radii substantially equal to that of the sprocket pin to be engaged thereby.

BRIEF DESCRIPTION OF DRAWINGS

FIG. 13 and FIG. 14 are top views of alternate chain designs;

DESCRIPTION OF PREFERRED EMBODIMENT

Figures 1, 2:
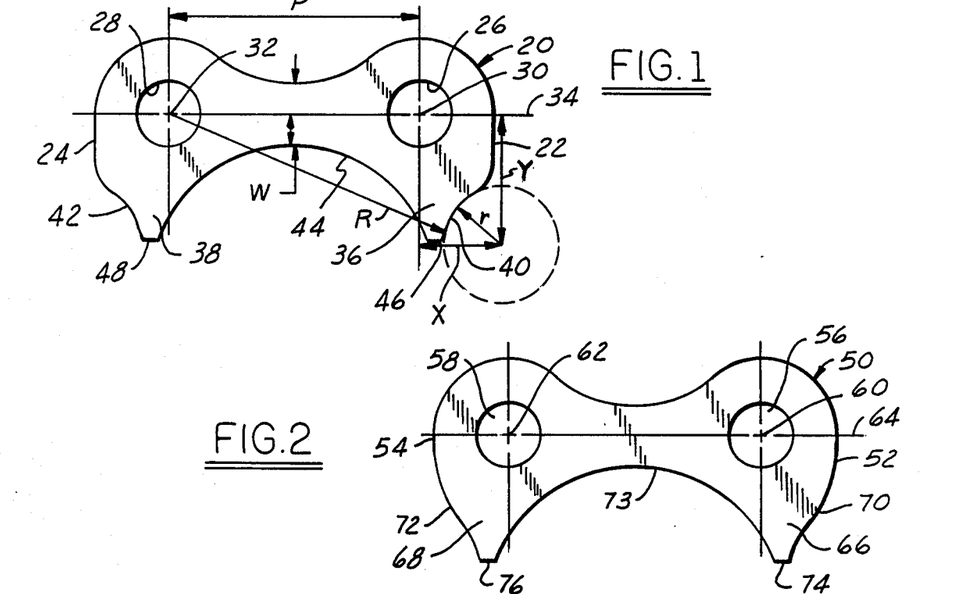
FIG. 1 is a side elevation of a link design for a sprocket having a minimum of 16 pins.
FIG. 2 is a side elevation of a link design for a sprocket a minimum of 18 pins.

With reference to the drawings, FIG. 1 shows a side elevation of a link 20 having two ends, referred to as first end 22 and second end 24. The first and second ends of the link each have a hole formed therein to form a pivot 26 and 28. The two pivots serve as a means for pivotably connecting adjacent links together, which would be accomplished using a conventional pin or the like. The center axis of the hole forming pivots 26 and 28 are designated pivot axes 30 and 32 respectively. The centerline 34 of the link 20 is defined by a line extending through the two pivot axes 30 and 32 in the plane of the link as shown. The link 20 has teeth 36 and 38 projecting transversely from the centerline 34. The forward edge of the first tooth 36 is called a drive face 40. The second tooth 38 has a drive face 42 generally facing the second end 24 of the link. Both of the drive faces have radii which are substantially equal to that of the sprocket pin that they will engage. The region between the teeth 36 and 38 is called the central recess 44 where a sprocket pin which is not engaging link 20 may be located. The point farthest from the centerline 34 on the teeth 36 and 38 are called the tips 46 and 48. The first tip 46 is designed so that when the link 20 is engaging or disengaging a cylindrical pin by rotating about the opposite pivot axis 32, the tooth 36 does not interfere.

FIG. 2 is a side elevation view of link 50, which is designed for a sprocket which has a different minimum radius than the link in FIG. 1. Link 50 has a first and second end 52 and 54 having pivots 56 and 58 wherein the pivots have pivot axes 60 and 62 which are perpendicular to plate 59. The centerline 64 is defined as extending between the pivot axes 60 and 62. The link 50 has teeth 66 and 68 which project transversely from centerline 64, upon which are located drive faces 70 and 72 where they respectfully face the first and second end 52 and 54 and have a radius substantially equal to that of the sprocket pins that they engage. The region between the teeth 66 and 68 is the central recess 73, where a sprocket engaging a link 50 may be located. The surfaces farthest from the centerline 64 on the teeth 66 and 68 are called the tips 74 and 76. The first tip 74 is designed so that when the link 50 is engaging or disengaging a cylindrical pin by rotating about the opposite pivot axis 62, the tooth 66 does not interfere. The second tip 76 is designed with respect to the first pivot axis 60.

Figure 4:
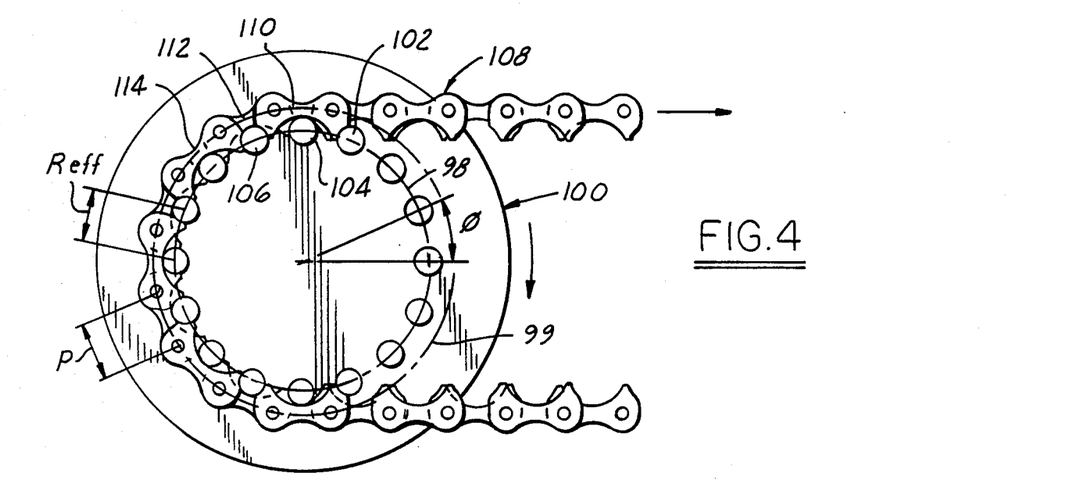
FIG. 4 is a side elevation of a 16 pin sprocket engaged with a chain.

The difference in shape between the two link embodiments shown in FIGS. 1 and 2 is dictated by the sprocket on which the link is intended to be used. Both links have the same pitch P, i.e., the distance between their first and second pivots, however, the orientation of the drive faces relative to the adjacent pivot axis is different. As shown in FIG. 1, drive face 40 is a concave surface having a radius with its center substantially coincident with the centerline of the pin to be engaged thereby, shown in dotted outline. The centerline of the pin is spaced a distance (X,Y) from pivot point 30. The orientation of the drive face to the adjacent pin will be dictated by the smallest diameter of a sprocket pin circle on which the chain is intended to be used. As shown in FIG. 4, when a chain is placed on the smallest sprocket diameter possible, the chain is prevented from bending any further, as the pins would pinch.

The link of FIG. 1 is designed to run a sprocket having 16 pins which have a 2.396" sprocket pin circle diameter. The link of FIG. 2 is designed to run on an 18 pin minimum sprocket. Notice that link 50 of FIG. 2 has a X-dimension greater than, and a Y-dimension less than link 20 of FIG. 1. Each of the links is designed for adequate clearance to bend at the desired minimum radius and to achieve minimum ratcheting force when used at the large sprocket diameters. While a chain of the FIG. 1 design could be run on a sprocket having a minimum pin circle with greater than 16 pins, the likelihood of ratcheting would not be minimized. Both links, 20 and 50, are designed having the link center region symmetrical about the link centerline. The symmetrical design allows the link to be loaded in tension axially without bending. When designing links 20 and 50 central region width W and pitch P were held constant, X and Y were selected to allow pin clearance and to minimize ratcheting. Note that choosing to maintain a link central region symmetrical about the centerline dictates that the chain pitch circle be greater than the sprocket pin circle. To minimize ratcheting, the chain pitch circle and the sprocket pin circle should be as close to one another as possible, i.e., Y should be minimized. In order to enable the chain to bend sharply, as required with smaller diameter sprockets, it is necessary to reduce dimension X, and similarly reduce the radius R which defines the tip face boundary, and increase dimension Y. Examples of typical chain links designed for sprockets having a minimum of 16 and 18 pins are shown in the following chart. Please note that the present examples are typical of a bicycle transmission having a 0.551" pitch chain and ¼" diameter sprocket pins. The actual dimensions for other applications may vary considerably as a function of the design parameters.

EFFECT OF SPROCKET MINIMUM DIAMETER ON LINK DESIGN

| Minimum # of Pins (dia) | FIG. 1<br>16 (2.396") | FIG. 2<br>18 (2.744") |
|---|---|---|
| P | .551 | .551 |
| X | .1828 | .1933 |
| Y | .2795 | .2703 |
| R | .6603 | .6668 |
| W | .1250 | .1250 |
| Thickness | .040 | .040 |
| Hole Diameter | .1250 | .1250 |

Figure 3:
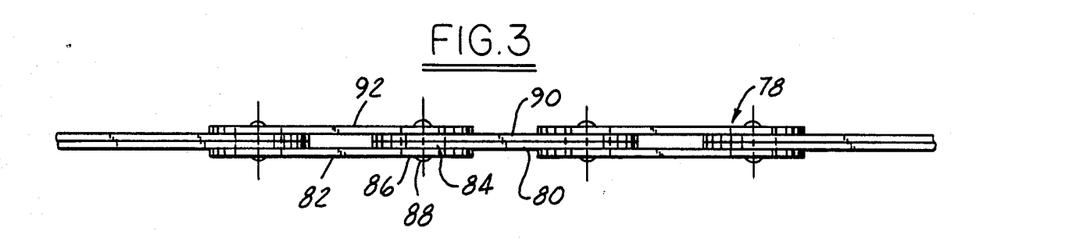
FIG. 3 is a top view of a chain.

FIG. 3 depicts a top view of a chain 78 formed of a plurality of links pivotably attached to one another in end-to-end relationship. The links are generally flat plates of a substantially uniform thickness. The links are attached to one another by pin 88 which acts as a pivot means for pivotably attaching adjacent links together to allow limited free rotation about a common pivot axis. A wide variety of pin designs capable of acting as a pivot means are shown in *Chains for Power Transmission in Material Handling,* American Chain Association, 1982, pages 47–77 and 95–117, which is incorporated by reference herein. One simple way of pivotably attaching the links together is to utilize the pin with a slightly smaller central region which will press into the outer links 82 and 92, while allowing the inner links 80 and 90 to freely rotate thereabout. In order to make the chain generally symmetrical about a longitudinal axis, the links are used in pairs so that the connecting pins are loaded symmetrically. Ideally, all of the links should be identical to one another so that a single forming die can be used. Links 80 and 90 form a first link pair which is pivotably attached to a second link pair 82 and 92 along a common pivot axis 86 by pin 88.

In FIG. 4, a chain 108 is shown engaging a sprocket 100 having a circular array of parallel pins projecting perpendicularly therefrom. The pins are spaced about a pin circle 98 having a diameter referred to as the pin circle diameter. The pins are spaced from one another at angle $\phi$, which is equal to 360 divided by N, where N is the number of pins on the circle. In FIG. 4, there are 16 pins, therefore, $\phi$ is equal to 22.5°. The pivots of the chain links engaging the cylindrical pins lie along a chain pitch diameter 99, which is greater than the sprocket pin diameter 98 by a distance equal to approximately $4Y\cos(\phi/2)$. It should also be noted that since the sprocket pin circle diameter is less than the chain pitch circle diameter, the sprocket pins are closer together than chain pitch P previously described. The effective pitch of the chain varies as a function of the diameter (D) of the sprocket in which it engages, i.e., effective pitch is equal to $D \sin(\phi/2)$. The effective pitch of the chain will only be equal to P when the chain is straight, i.e., infinitely large sprocket diameter. As the chain wraps around a sprocket, the effective pitch becomes less than P. Therefore, it is important to properly design the sprocket so that the pitch of the sprocket is substantially equal to the effective pitch of the chain to minimize interference and properly distribute the load about the pins.

The chain 108 in FIG. 4 has links designed to be able to cooperate with a sprocket having a minimum diameter of 16 pins, and to have as low a ratcheting force as possible. Three pins 102, 104 and 106 are shown cooperating with three links 110, 112 and 114. When the sprocket is rotated clockwise, the chain is moving in the direction of the arrow. The first drive faces of links 110, 112 and 114 are driving pins 102, 104 and 106 respectively. Pin 106 is captured on three sides by the first drive face of link 114, the central recess of 112, and the second drive face of link 110. Six of the pins located counter-clockwise from pin 106 are likewise trapped on three sides. Note that each pin is located in the central recess of a link and is being driven by the first drive face of the immediately trailing link. At the smallest sprocket diameter, there is little, if any, clearance between a sprocket pin and the second drive face of the link immediately preceding the pin. As the sprocket rotates slightly from the position shown in FIG. 4, link 110 will rotate counter-clockwise relative to the link 112 about their common pivot axis causing the first drive face of link 110 to disengage pin 102. As previously discussed, the tip of the tooth must be designed to prevent entry and exit interference with the pin. Preferably, the tip face falls within an arc tangent to the drive face having a center corresponding to the opposite pivot center. The arc has a radius R shown in FIG. 1.

Figure 5:
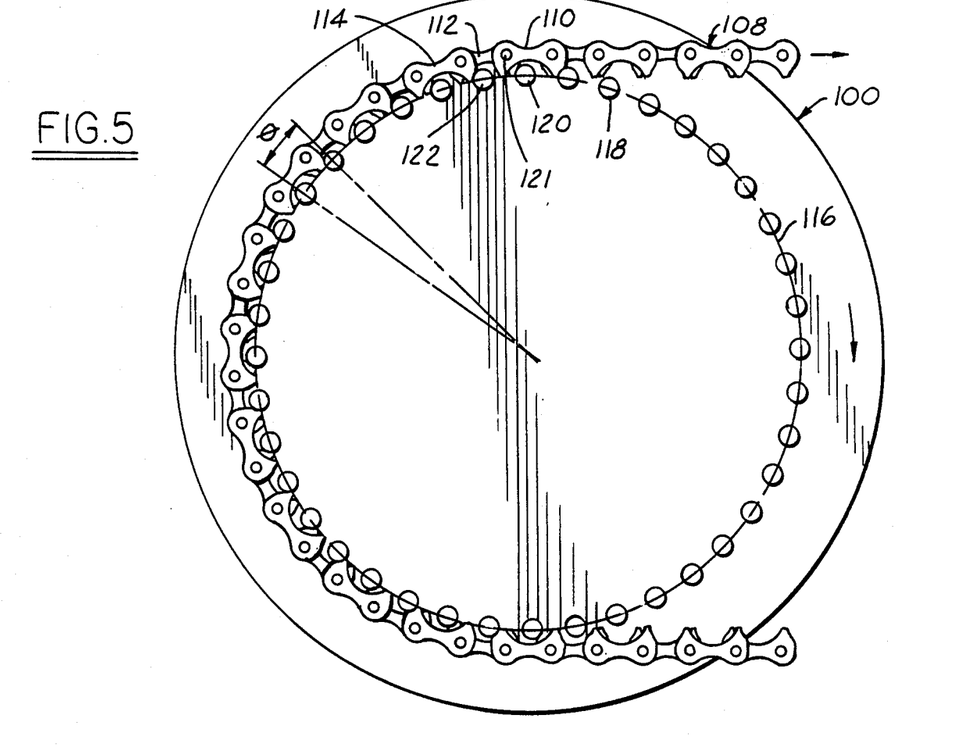
FIG. 5 is a side elevation of a 16 pin design chain engaging a radius sprocket.

FIG. 5 shows the chain 108 of FIG. 4 cooperating with a sprocket 100 having the 40 pin circle 116 engaging the chain. Links 110, 112 and 114 are shown engaging 118, 120 and 122. Since angle $\phi$ is much smaller, (360 divided by 40=9°) the chain is much straighter, resulting in significant clearance between a driven pin and the adjacent link central recess and the preceding link second drive face.

Figure 6:
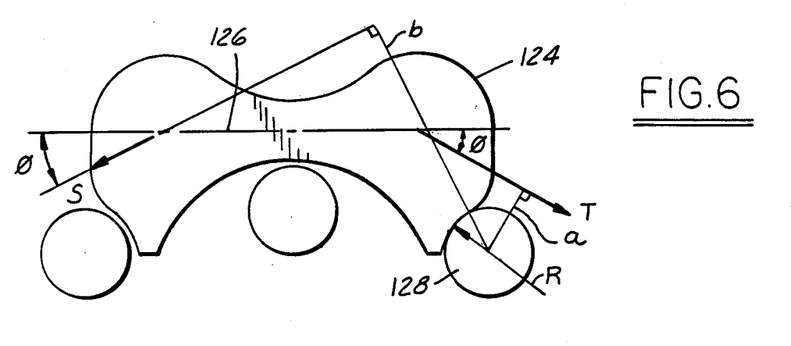
FIG. 6 is a force moment diagram of a chain link of the present design.

In order to better understand the difference between the present link and the prior art, it is helpful to evaluate a free body diagram of the present invention and the prior art design of Iseman. Both the present chain and the Iseman chain have a chain pitch diameter in excess of the diameter of the engaged sprocket pins, enabling the use of strong, lightweight chain links which do not tend to open up when loaded in tension, like the links of Tygard. In FIG. 6 a free body diagram of the link 124 is shown. The link has a centerline 126. The link 124 is driving pin 128 with its first drive face. The central and trailing pin are not engaging the link. The reaction force R is exerted on the link by pin 128 in the direction of the vector shown. The pivot connecting the first pivot axis of the link to the preceding link exerts a force T in the direction of the vector. The link immediately following link 124 exerts a force designated by the vector S on the second pivot axis of link 124. Vectors T and S extend through the first and second pivots respectively, and diverge from the centerline 126 at an angle O which corresponds to the number of pins on the sprocket. The relationship between vectors T and S may be evaluated taking the sum of the moments about point O, the origin of pin 128.

$$\Sigma M_o = Ta - Sb = 0 \text{ Therefore, } Ta = Sb \text{ or } T/S = b/a$$

Figure 7:
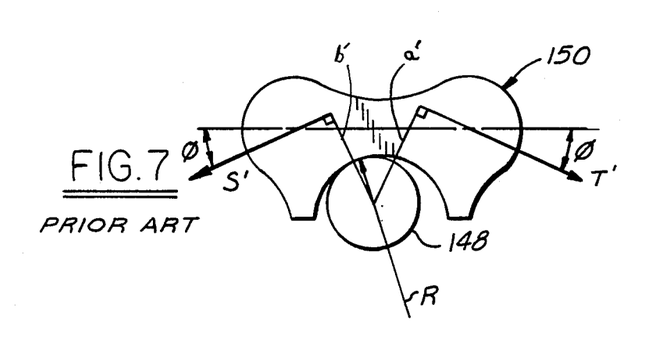
FIG. 7 is a force moment diagram of a prior art link.

The term b/a is strictly a matter of chain geometry and the angle $\phi$. When $\phi$ is large, as shown in FIG. 6, T is significantly greater than S. As $\phi$ approaches O, B and A both approach Y. As shown in FIG. 7, using a Tygard type link in which the pin 148 within the central recess of link 150 is driven, the free body diagram looks much different. Analyzing the sum of the moments about pin 148 at an equilibrium state, one will readily note that since $a'$ is very close to $b'$, the tension vector $T'$ and the slack vector $S'$ are much more similar in magnitude than vectors T and S in FIG. 6. If insufficient tension is not maintained on the slackside of the chain, the chain will ratchet across the sprocket. The link of the present invention, as a result of its geometry, is much less likely to ratchet than the prior art design of Iseman. As a result of the reduced chain slackside tension requirement, the chain tensioning means employed by the drive system may be simplified.

Figure 8:
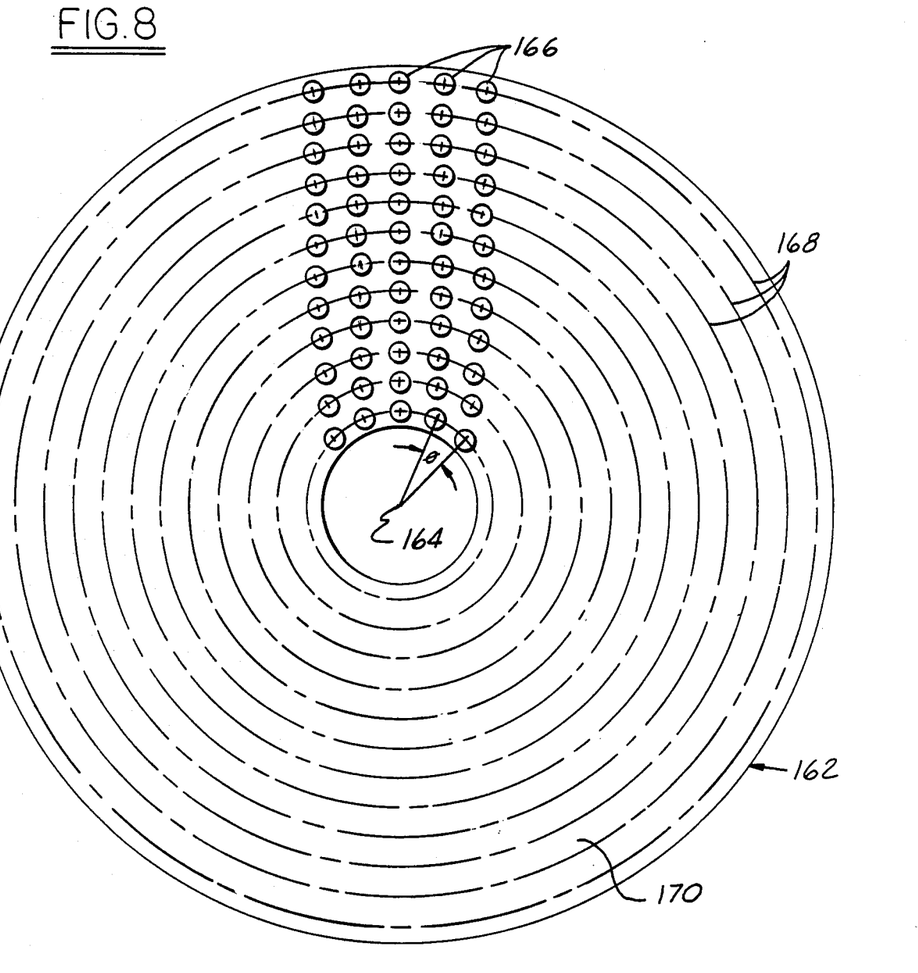
FIG. 8 is a side view of a sprocket with a plurality of cylindrical pins.

FIG. 8 is a plan view of a sprocket 162 having a plurality of cylindrical pins 166 oriented in 12 concentric circular rows 168 having a sprocket axis 164 as a center. The smallest row has 16 pins, and the largest diameter row has 60 pins. The sprocket pin row diameter is carefully selected so that the sprocket pitch will correspond to the effective pitch of the chain for the given angle $\phi$.

By way of example, the configuration of a sprocket designed to cooperate with the chain shown in FIG. 1 previously described is set forth below as one typical example of the preferred embodiment of the invention.

| Number of Pins | Pin Circle Diameter | $\phi$ |
| --- | --- | --- |
| 60 Pin | 9.996" | Ang. 6.0000° |
| 56 Pin | 9.298" | Ang. 6.4286° |
| 52 Pin | 8.598" | Ang. 6.9230° |
| 48 Pin | 7.900" | Ang. 7.5000° |
| 44 Pin | 7.204" | Ang. 8.1818° |
| 40 Pin | 6.506" | Ang. 9.0000° |
| 36 Pin | 5.812" | Ang. 10.0000° |
| 32 Pin | 5.118" | Ang. 11.2500° |
| 28 Pin | 4.426" | Ang. 12.8571° |
| 24 Pin | 3.740" | Ang. 15.0000° |
| 20 Pin | 3.060" | Ang. 18.0000° |
| 16 Pin | 2.396" | Ang. 22.5000° |

During operation of the multi-ratio drive system, the power is transmitted between two rotating sprockets by a chain. At least one of the sprockets has a plurality of rows of pins having different diameters wherein one or more of the rows of pins are shiftable axially between an engaged and disengaged position, allowing the effective diameter of the sprocket to be varied. The drive system additionally includes a chain slack tensioning device and a means for moving the pins between an engaged and disengaged position. The means for moving the pins and the chain tensioning are shown in U.S. Pat. No. 4,457,739.

Figure 13:
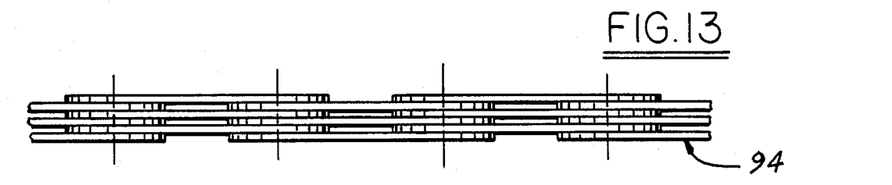
Figure 14:
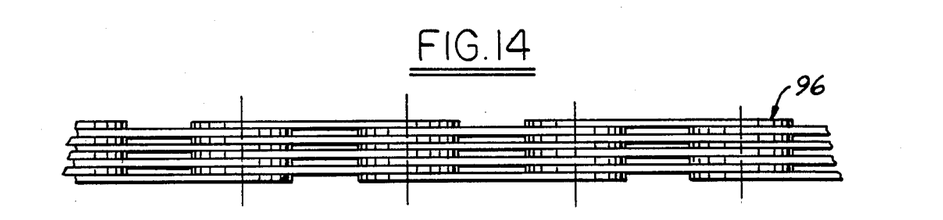
FIG. 14 is a side elevation of a link capable of engaging on both sides.

FIG. 13 and FIG. 14 show plan views of alternate chain designs 94 and 96. It should be understood that the links can be used in various multiple link combinations to achieve the strength necessary for a given situation.

Belt Driven Multi-Ratio Drive System

Figure 9:
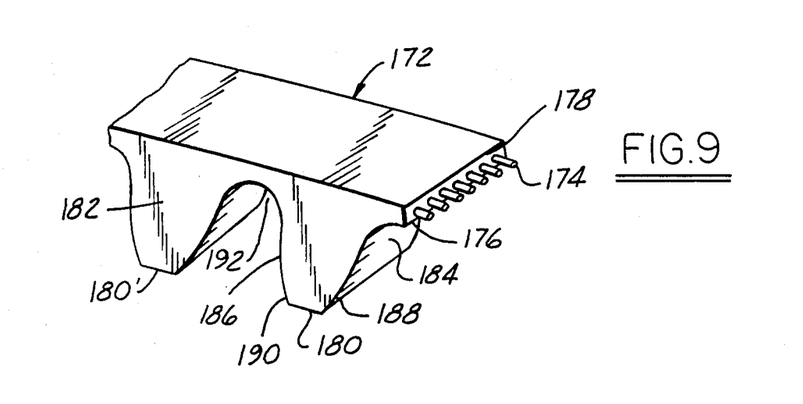
FIG. 9 is a perspective view of a synchronous belt segment.

An alternative to the chain previously described is a belt. The present invention may be used to drive a sprocket having a plurality of rows of cylindrical pins. A segment of a belt is shown in FIGS. 9–12. The synchronous belt 172 of FIG. 9 is composed of a flat band 174 serving as a tension member which is formed in an endless loop having a inner circumferential surface 176, and an outer circumferential surface 178. The teeth 180 and 180' are equally spaced apart and affixed to the inner circumferential surface 176. The teeth project locally perpendicular from the inner circumferential surface 176 with a tooth axis 182 being defined as a line that is locally perpendicular to the inner circumferential surface. The teeth each have a first drive face 184 and a second drive face 186 similar to the link 20 in FIG. 1 which are also concavely shaped and having a radius that is substantially equal to that of the cylindrical pin. The teeth on the synchronous belt 172 also has tip faces 188 and 190 similar to link 20 to permit the engaging and disengaging of the sprocket without interfering with the teeth. The area on the synchronous belt located between two teeth defines central recess 192.

Figure 10:
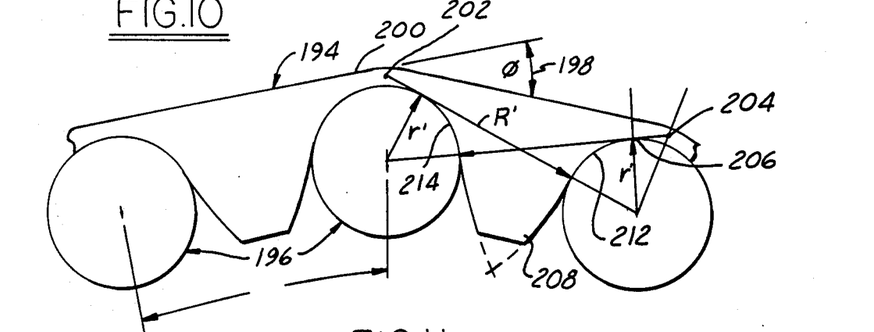
FIG. 10 is a side elevation of a synchronous belt engaging the cylindrical pins of a small sprocket.

The synchronous belt is like the chain in that it is specifically designed with respect to the minimum sprocket diameter in which the belt is to be used. FIG. 10 shows a synchronous belt 194 engaging cylindrical pins 196 that are equally spaced radially from one another in a circular array at the minimum radius the synchronous belt 194 was designed for. The change of angle $\phi$ of the outer circumferential surface segment 200 is equal 360 degrees divided by the number of pins on the circle, i.e., $360/16 = 22.5$.. This angle is the same as the angle between two neighboring cylindrical pins.

The design limitations of the tooth profile may be best described with reference to FIG. 10, which shows the belt wrapped about a sprocket having a minimum diameter In the minimum diameter orientation, both the first drive face 212, and the second drive face 214 of a tooth may engage the ends immediately prior to, and immediately following, the tooth as shown. The first and second drive faces are concave cylindrical segments having a radius and a centerline corresponding to a cylindrical pin to which it is designed to engage. As shown in FIG. 10, pin radius r' matches that of drive face 212 and 214. The tip face 208 is a portion of the tooth outwardly spaced from the drive face. It is important that the drive face be designed so that it does not cause entry and exit interference. For the purpose of analysis, a belt may be considered as equivalent to a number of tooth segments pivotably attached together. The tooth of FIG. 10 is pivotably connected to adjacent teeth at effective points 202 and 204 which generally fall in the center of the belt web section and between adjacent teeth. An arc extending the effective pivot point to the adjacent tooth has a radius R'. Preferably, the tip face falls within an arc defined by radius R, so that the tip face will not interfere with the adjacent pin as the tooth rotates about the effective pivot point. It should also be noted that the belt geometry is highly dependent upon the diameter of the sprocket pins. Generally, it is desirable to have the sprocket pins as small as possible, thereby causing the difference between sprocket diameter and the effective belt diameter to be minimized. Synchronous belts also have a problem very similar to chain ratcheting where the belt will slip relative to the drive sprocket. Belt slippage is typically referred to as "jumping". The belt of the present invention will be most likely to jump at large sprocket diameters where $\phi$ is the smallest, but at these diameters, a large number of pins are in contact.

Figure 11:
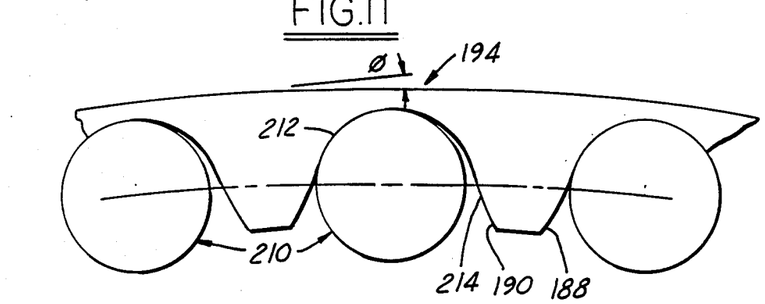
FIG. 11 is a side elevation of the same synchronous belt shown in FIG. 10 engaging the cylindrical pins of a large sprocket.
Figure 12:
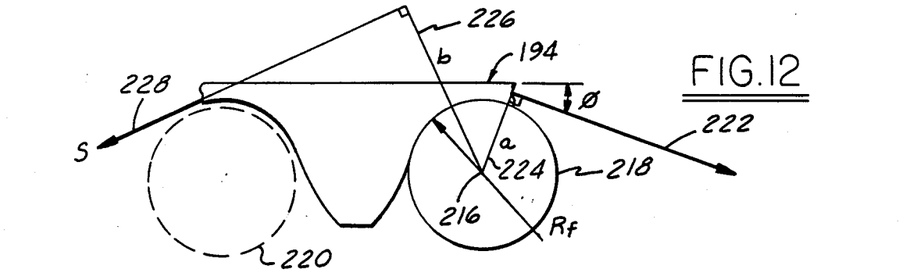
FIG. 12 is a free moment diagram of a segment of synchronous belt.

The same synchronous belt 194 engaging a sprocket of a greater radius is shown in FIG. 11 where the cylindrical pins 210 only engage the first drive face 212, and there is a space between the cylindrical pins 210 in the second drive face 214. This is very similar to the chain in FIG. 5. FIG. 12 shows a free body diagram of a segment of synchronous belt 194 where the forces are summed about a center of a radius 216 of a cylindrical pin 218. The adjacent cylindrical pin 220 does not engage the segment of synchronous belt 194. The tension force 222 interacting with the next segment of synchronous belt to the cylindrical pin 218 has a moment arm "a" (224) about the center of radius 216 of the cylindrical pin 218 that is smaller than the moment arm "b" (226) of the slack force "s" (228). This results in the slack force being smaller than the tension force 222 similar to the link, and is a function of b and a as defined by the following equation:

$$T/S = b/a$$

With the exception of the belt tooth profile, the belt of the present invention is fabricated similar to conventional synchronous belts. U.S. Pat. No. 3,756,091 — Miller, which is incorporated by reference herein, describes several conventional tooth powered transmission belts in great detail.

ALTERNATE DESIGNS

Figure 15:
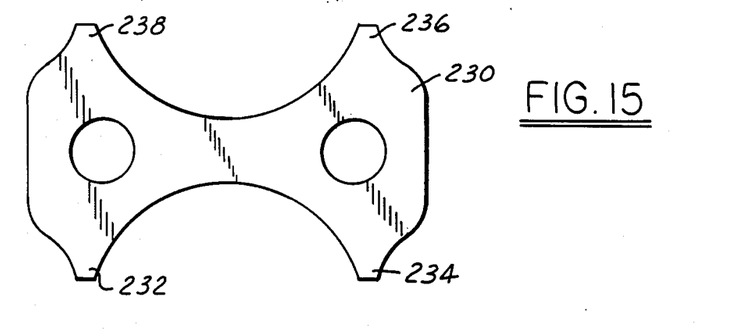
FIG. 15 is a side elevation of an alternative coined link.

There can, of course, be many alternative structures which embody the present invention in addition to those previously described. One such example of an alternative structure is the double sided chain or belt which is from time to time used in industrial situations. When both sides of the chain are intended to be used, the links will have teeth projecting from both sides of the centerline. FIG. 15 shows a link 230 which has teeth 232, 234, 236 and 238 that allow it to engage chains on both sides of the link. These teeth on opposite sides of the chain do not have to be designed for the same minimum radius sprocket. Teeth 232 and 234 could be designed for a 16 pin sprocket whereas 236 and 238 could be designed to be used with a 18 pin sprocket for example.

Figure 16:
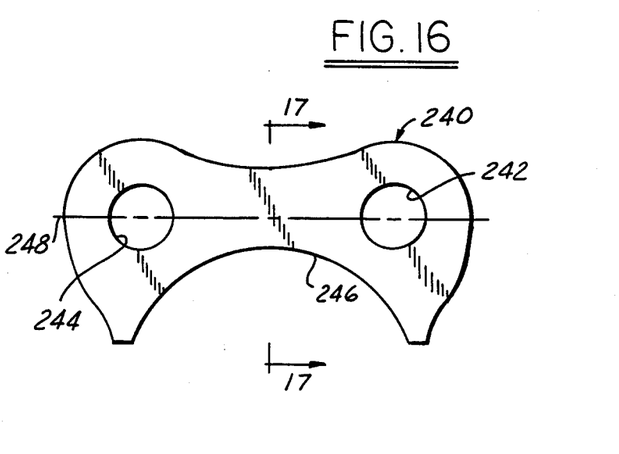
Figure 17:
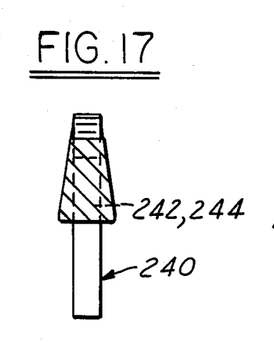
FIG. 17 is a cross-sectional view taken along line 17—17 of FIG. 16.
Figure 18:
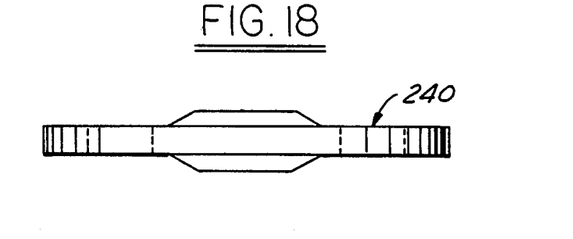
FIG. 18 a top view of the coined link of FIG. 16.

It should also be noted that the links forming a chain need not be perfectly flat, nor does the center section need to be symmetrical about the link centerline. As shown in FIGS. 16–18 a link 240 can have a section that is located between the first and second pivot 242 and 244 that is coined in a shape that is not generally flat like the rest of the link. The coining of the link 240 would allow the central recess 246 to be larger enabling the chain pitch diameter to be closer to the pin circle diameter. The coined link 240 would still maintain the benefit of having the centroid of the center section of link 240 located on the centerline 248, allowing the link 240 to be elongated in tension without centerline bending.

It is also understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

I claim:

1. A chain link for engaging a sprocket having a plurality of parallel cylindrical pins equally spaced radially from one another in a circular array, said link comprising:
    a plate having a first and second end having formed therein;
    a first and second pivot located in the first and second plate ends respectively, defining a first and second pivot axis perpendicular to the plate and having extending therebetween a link centerline; and
    a first and second tooth located adjacent the first and second pivots respectively and projecting transversally from the centerline for engaging the pins of the sprocket, said first tooth having a first drive face oriented toward the first end and said second tooth having a second drive face oriented toward the second end, wherein said drive faces are concave and have a radius substantially equal to that of the sprocket pins to be engaged thereby.

2. The link of claim 1 further provided with a central recess extending generally between the first and second tooth providing clearance for a sprocket pin.

3. The link of claim 1 further provided with a central region located between the first and second ends, wherein a section through said central region perpendicular to the link centerline has a centroid which falls substantially on the link centerline thereby preventing link bending during tensile loading.

4. The link of claim 3 wherein said link central region is generally symmetrical about the link centerline.

5. The link of claim 1 wherein the teeth are further provided with a tip face located on said teeth outboard of the centerline from the drive face to facilitate engaging and disengaging of the sprocket pins without interference during the rotation of the link relative to the non-adjacent pivot axis.

6. The link of claim 5 wherein said tip face falls within an arc which is tangent to the adjacent drive face, and has as a locus the non-adjacent pivot.

7. The link of claim 6 wherein said tip face is generally convex and tangent to the drive face.

8. The chain of claim 6 wherein said tip face is generally convex and tangent to the drive face.

9. The chain of claim 5 wherein said tip face falls within an arc which is tangent to the adjacent drive face and has as a locus the non-adjacent pivot.

10. The invention of claim 1 further provided with a third and fourth tooth located adjacent to the first and second pivots respectively and projecting transversely from the centerline in a direction opposite of the first and second tooth.

11. A chain for engaging a sprocket having a plurality of parallel cylindrical pins equally spaced radially from one another in a circular array, said chain comprising:
    a plurality of links, each a generally flat plate having a first and second end, said links pivotably connected end to end with one another to form an elongated flexible member, each of said links having formed therein; a first and second pivot located in the first and second ends respectively, defining a first and second pivot axis perpendicular to the plate and having extended therebetween a link centerline, each link having a first and second tooth adjacent the first and second pivots and projecting transversely from the centerline for engaging the pins of the sprocket, said first tooth having a first drive face oriented towards the first end and said second tooth having a second drive face oriented towards the second end, said drive faces having a radius substantially equal to that of the sprocket engaged thereby; and
    pivot means for pivotably connecting the adjacent links to one another to allow limited free rotation about a common pivot axis, to form an elongated chain segment.

12. The chain of claim 11 wherein said link is further provided with a central recess extending generally between the first and second tooth providing clearance for a sprocket pin.

13. The chain of claim 9 wherein said link is further provided with a central region located between the first and second ends, wherein a section through said central region perpendicular to the link centerline has a centroid which falls substantially on the link centerline, thereby preventing link bending during tensile loading.

14. The chain of claim 11 wherein the teeth are further provided with a tip face located on said teeth outboard of the centerline from the drive face to facilitate engaging and disengaging of the sprocket pins without interference during the rotation of the link relative to the non-adjacent pivot axis.

15. A chain link for engaging a sprocket having a plurality of parallel cylindrical pins equally spaced radially from one another in a circular array, said link comprising:
    a plate having a first and second end having formed therein;
    a first and second pivot located in the first and second plate ends respectively, defining a first and second pivot axis perpendicular to the plate and having extending therebetween a link centerline;
    a central region located between the pivots wherein thickness of the plate in the central region is greater than the first and second ends, and a section through the central region has a centroid located on the link centerline so that there is no out of plane deformation when there is tension exerted on the links; and
    a first and second tooth located adjacent the first and second pivots respectively, and projecting transversely from the centerline for engaging the pins of the sprocket, said first tooth having a first drive face oriented toward the first end and said second tooth having a second drive face oriented toward the second end, said drive faces having a radius substantially equal to that of the sprocket pins to be engaged thereby.

16. The chain of claim 15 wherein said link is further provided with a central recess extending generally between the first and second tooth providing clearance for a sprocket pin.

17. The chain of claim 15 wherein said link is further provided with a central region located between the first and second end, wherein the centroid of a perpendicular section through the central region falls substantially on the link centerline thereby preventing link bending during tensile loading.

18. The chain of claim 15 wherein the teeth are further provided with a tip face located on said teeth outboard of the centerline from the drive face to facilitate engaging and disengaging of the sprocket pins without interference during the rotation of the link relative to the non-adjacent pivot axis.

19. A multi-ratio drive for transmitting motion between a first and second sprocket using a chain, said multi-ratio drive comprising:
a first sprocket having a disk and a plurality of parallel cylindrical pins located in concentric rows equally spaced radially from one another within each row;
means for moving the pins in a row of the extended and a retracted position to change the effective diameter of the first sprocket;
a second sprocket having a plurality of parallel cylindrical pins equally spaced radially from one another in a circular array;
an endless chain cooperating with the first and second sprockets to transmit power therebetween, said chain formed of a plurality of links each a generally flat plate having a first and second end, said links pivotably connected end to end with one another to form an elongated flexible member, each said link having a first and second spaced apart pivot located in the first and second plate ends respectively, defining a first and second pivot axis perpendicular to the plate and having extended therebetween a link centerline, and each link having a first and second tooth located adjacent to the first and second pivots respectively, and projecting transversely from the centerline for engaging the pins of the sprocket, said first tooth having a first drive face oriented towards the first end, and said second tooth having a second drive face oriented towards the second end, said drive faces having a radius substantially equal to that of the sprocket engaged thereby; and
a means for taking up slack and maintaining tension in the chain.

20. The multi-ratio drive of claim 19 wherein the teeth are further provided with a tip face located on said drive face to facilitate engaging and disengaging of the sprocket pins without interference during the rotation of the link relative to the non-adjacent pivot axis.

21. The multi-ratio drive of claim 19 wherein the spacing between adjacent pins on each concentric row on a sprocket is substantially equal to the effective chain pitch when wrapped at that diameter of the engaged pin row.

22. A multi-ratio drive for transmitting motion therebetween a sprocket and a chain, said multi-ratio drive comprising:
a sprocket having a disk and a plurality of parallel cylindrical pins located in concentric rows equally spaced radially from one another within each row;
means for moving the pins in a row normal to the disk thereby extending or retracting the pins wherein changing the ratio;
a chain having a plurality of links each a generally flat plate having a first and second end, said links pivotably connected from end to end with one another to form an elongated flexible member, each said link having a first and second pivot located in the first and second plate ends respectively, defining a first and second pivot axis perpendicular to the plate and having extended therebetween a link centerline, and each link having a first and second tooth located adjacent to the first and second pivots respectively, and projecting transversely from the centerline for engaging the pins of the sprocket, said first tooth having a first drive face oriented towards the first end, and said second tooth having a second drive face oriented towards the second end, said drive faces having a radius substantially equal to that of the sprocket engaged thereby; and
a means for maintaining tension on the chain.

23. The multi-ratio drive of claim 22 wherein said link is further provided with a central region located between the first and second end, wherein the centroid of a perpendicular section through the central region falls substantially on the link centerline, thereby preventing link bending during tensile loading.

24. The multi-ratio drive of claim 22 wherein the spacing between adjacent pins on each concentric row on a sprocket is substantially equal to the effective chain pitch when wrapped at that diameter of the engaged pin row.

25. A synchronous belt for engaging a sprocket having a plurality of parallel cylindrical pins equally spaced radially from one another in a circular array, said synchronous belt comprising:
an endless flexible tension member loop having an inner and outer circumferential surface; and
a plurality of equally spaced teeth affixed to the tension member inner circumferential surface and projecting locally perpendicular therefrom for cooperation with a pin on the sprocket, extending therefrom along a tooth axis, each of said teeth provided with a first drive face located forward of the tooth axis and a second drive face located rearward of the tooth axis, wherein said drive faces are concavely shaped and have a radius substantially equal to that of a sprocket pin.

26. The synchronous belt of claim 25 wherein the teeth are further provided with a tip face located on said teeth outboard of the drive face to facilitate engaging and disengaging of the sprocket pins without interference, said tip face being convexly shaped falling within an arc tangent to the drive face and having a locus falling on the endless flexible tension member connecting the adjacent tooth.

27. The belt of claim 25 wherein the first drive face of a tooth is provided with a first center radius, and the second drive face of an adjacent tooth is provided with a second center radius, wherein the first and second center radius are spaced apart, thereby allowing the cylindrical pin to engage a drive face without interference with from the adjacent tooth.

28. A multi-ratio drive for transmitting motion therebetween a first and second sprocket through a belt, said multi-ratio drive comprising:
a first sprocket having a disk and a plurality of parallel cylindrical pins located in concentric rows equally spaced radially from one another within the row;

means for moving the pins in a row normal to the disk, thereby extending or retracting the pins wherein changing the ratio;

a sprocket having a plurality of parallel cylindrical pins equally spaced radially from one another in a circular array;

a belt comprising an endless flexible tension member loop having an inner and an outer circumferential surface, a plurality of equally spaced teeth affixed to the tension member and a circumferential surface, and projecting locally perpendicular therefrom for cooperation with a pin on the sprocket engaged therewith along a tooth axis, each of said teeth provided with a first drive face located forward of the tooth axis, wherein said drive faces are concavely shaped and have a radius substantially equal to that of the sprocket; and a means for taking up the slack and maintaining tension.

29. The multi-ratio drive of claim 28 wherein the teeth are further provided with a tip face located on said teeth outboard of the drive face to facilitate engaging and disengaging of the sprocket pins without interference, said tip face being convexly shaped falling within an arc tangent to the drive face and having a locus falling on the endless flexible tension member connecting adjacent teeth.

30. The multi-ratio drive of claim 28 wherein the spacing between adjacent pins on each concentric row on a sprocket is substantially equal to the effective belt pitch when wrapped at that diameter of the engaged pin row.

* * * * *

UNITED STATES PATENT AND TRADEMARK OFFICE
CERTIFICATE OF CORRECTION

PATENT NO. : 4,854,925

DATED : August 8, 1989

INVENTOR(S) : Tirupathi R. Chandrupatla

It is certified that error appears in the above-identified patent and that said Letters Patent is hereby corrected as shown below:

Column 6, Line 19
"E" should be --$\Sigma$--.

Column 7, Line 51
"5.." should be --5°.--.

Column 7, Line 56
after "eter" insert a --.--.

Column 8, Line 7
"R," should be --R'--.

Column 11, Line 24, Claim 19
after "of the" insert --first sprocket normal to the disk between an--.

Signed and Sealed this

Twenty-second Day of October, 1991

*Attest:*

HARRY F. MANBECK, JR.

*Attesting Officer*    *Commissioner of Patents and Trademarks*